June 18, 1968    J. H. BENT    3,388,726
WIRE STRETCHER AND STRAIGHTENER
Filed June 26, 1964    2 Sheets-Sheet 1
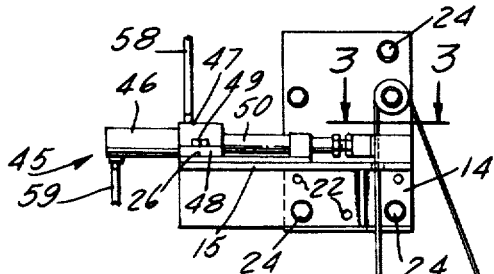
Fig. 1.
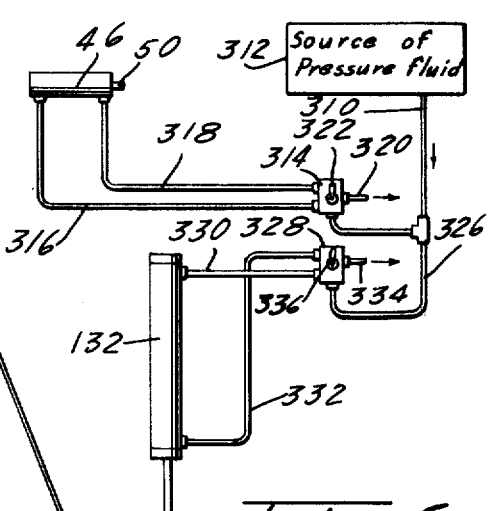
Fig. 6.
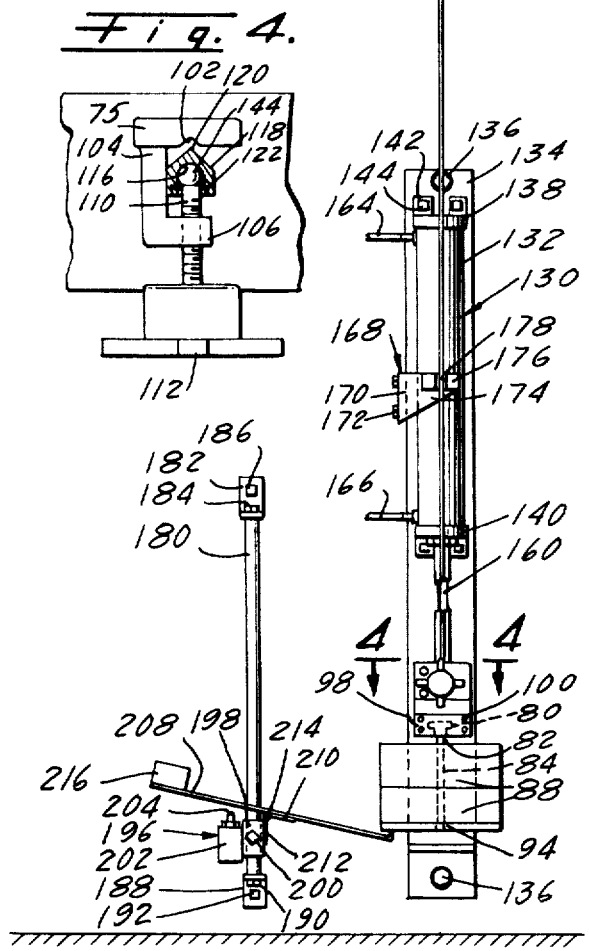
Fig. 4.
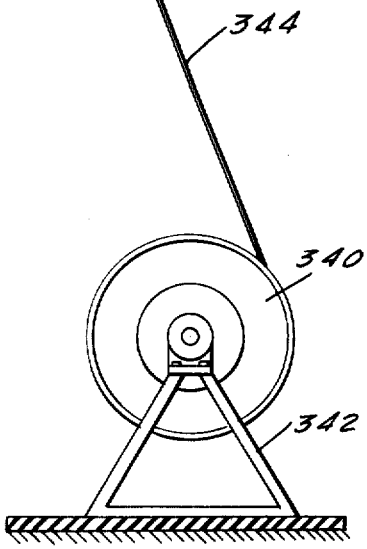
INVENTOR.
John H. Bent
BY
Attorney June 18, 1968     J. H. BENT     3,388,726
WIRE STRETCHER AND STRAIGHTENER
Filed June 26, 1964                                       2 Sheets-Sheet 2
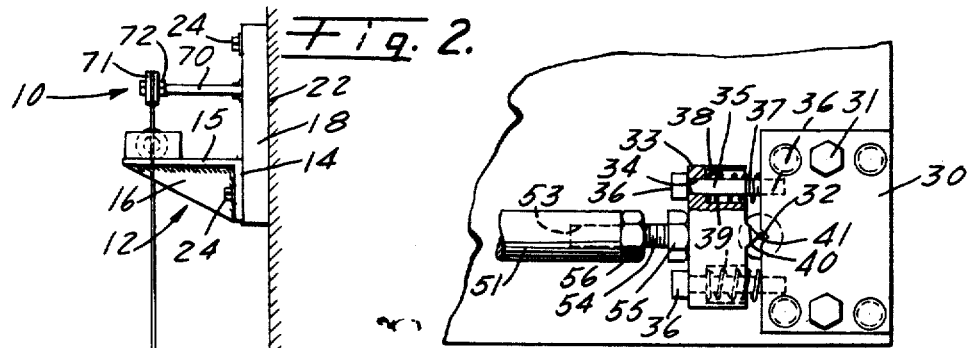
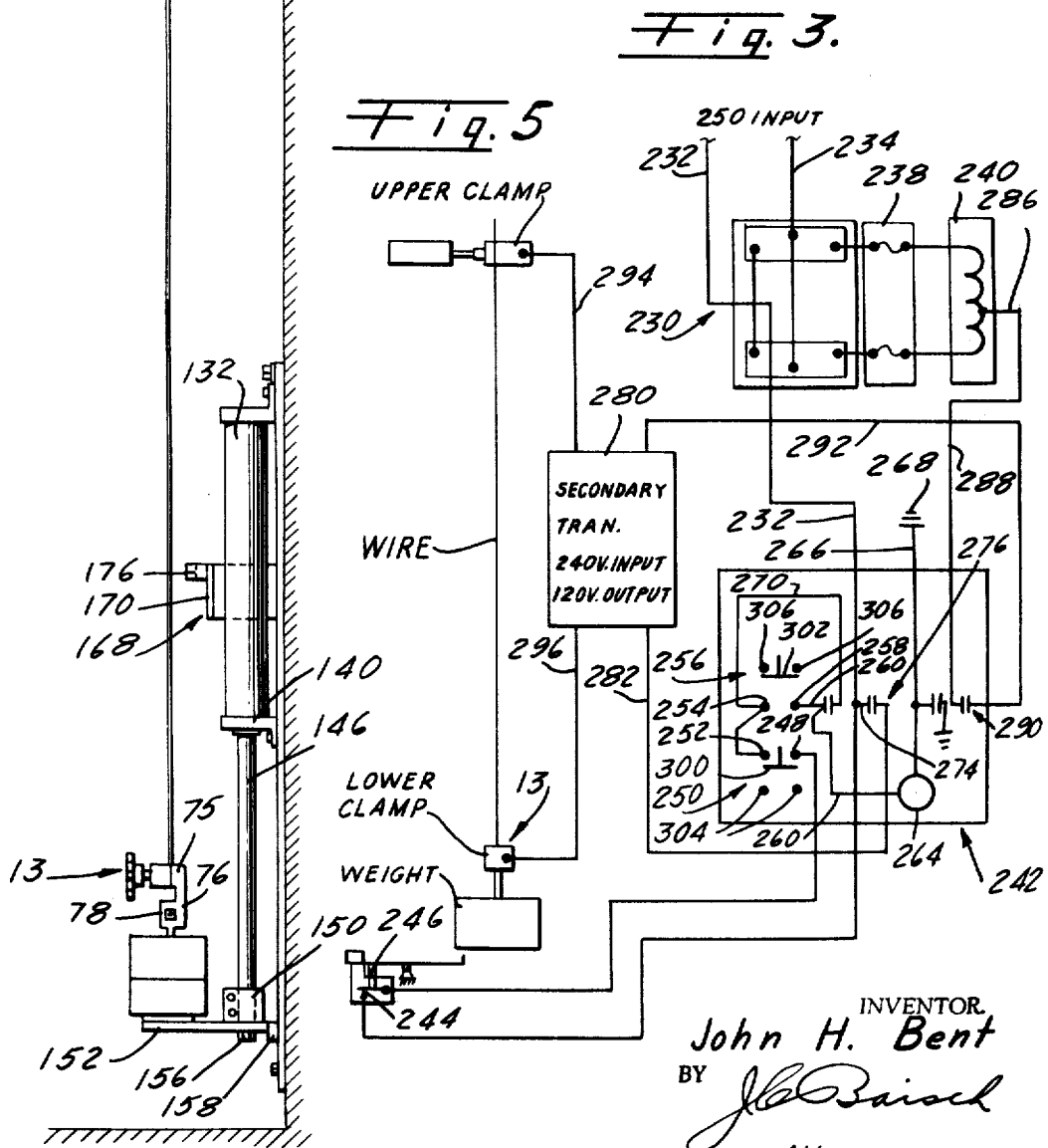
INVENTOR.
John H. Bent
BY
Attorney

United States Patent Office 3,388,726
Patented June 18, 1968

3,388,726
WIRE STRETCHER AND STRAIGHTENER
John H. Bent, Fullerton, Calif., assignor to Hamilton Company, Inc., Whittier, Calif., a corporation of California
Filed June 26, 1964, Ser. No. 378,317
15 Claims. (Cl. 140—147)

This invention relates generally to improvement in the manufacture of syringes and relates more particularly to method and means or apparatus for making mandrels used in the making of glass barrels for syringes.

In certain types of scientific work, such as chromatography, syringes of extremely high accuracy are required. Many syringes used in this work have glass barrels and in making these glass syringes, according to one method and apparatus, a length of wire is precision ground and used as a mandrel for shrinking a length of glass tubing thereon for the barrels, such method and apparatus being disclosed in the Clark H. Hamilton application for Apparatus and Method for Making Straight Precision Glass Barrels or Bodies for Syringes, Ser. No. 238,459, filed Nov. 19, 1962, now Patent 3,249,414.

While the present invention has particular utility in connection with certain parts of equipment or apparatus and method for producing syringes having the maximum degree of accuracy for scientific work, and is shown and described in such connection, it is to be understood that its utility is not confined thereto.

With the normal straight wire used in the apparatus and method for making precision glass barrels or bodies for syringes as disclosed in the above referred to Clark H. Hamilton application, Ser. No. 238,459, the heat required to melt the glass of the glass tube disposed on the mandrel relieves the steel stresses in the wire and causes it to unwind or twist, which in turn cracks the glass tubing.

It is therefore an object of the invention to overcome this difficulty and solve this problem.

It is another object of the invention to provide wire mandrels for making glass barrels for glass syringes that will not crack the glass tubing being processed.

It is still another object of the invention to provide apparatus and method that will eliminate all, or, for practical purposes, substantially all internal stresses in the wire mandrels.

A further object of the invention is to provide means for stretching and straightening the wire for use as such mandrels.

It is a still further object of the invention to provide means for finishing the wire in an annealed condition.

It is another object of the invention to provide apparatus and method for stretching and straightening the wire by putting a pull on length of the wire and simultaneously heating same.

It is still another object of the invention to heat the wire to a red hot condition, using the resistance of the wire for this purpose.

It is a further object of the invention to provide apparatus of this character that will stretch the wire a predetermined amount.

It is a still further object of the invention to automatically control the amount of stretch of the wire.

It is another object of the invention to produce mandrels for precision glass syringes which, because of the great accuracy and precision of the wire, or mandrel, used for making precision bore glass barrel or body blanks, the production per man is greatly increased.

The characteristics and advantages of the invention are further sufficiently referred to in connection with the following detailed description of the accompanying drawings, which represent one embodiment. After considering this example, skilled persons will understand that variations may be made without departing from the principles disclosed and I contemplate the use of any structure, arrangments, mode of operation or steps of the method that are properly within the scope of the appended claims.

Referring to the drawings, which are for illustrative purposes only:

FIG. 1 is a diagrammatic front view of apparatus embodying the present invention;

FIG. 2 is a side view thereof;

FIG. 3 is an enlarged view of a portion of the upper clamp, taken on lines 3—3 of FIG. 1;

FIG. 4 is an enlarged top plan view of the lower clamp as viewed on line 4—4 of FIG. 1;

FIG. 5 is a diagrammatic view of the wiring system of the present invention; and FIG. 6 is a diagrammatic view of the pneumatic system.

Referring more particularly to the drawings, there is shown an upper clamp, indicated generally at 10. This clamp is mounted on a bracket indicated generally at 12 and having a vertical arm 14 and a horizontal arm 15 with an interconnecting web 16. The horizontal arm 14 is secured to a supporting block 18 by means of bolts or screws 20. Block 18 is secured by means of screws 24 to a suitable nonelectrically conducting supporting structure such vertical wall 22.

The upper clamp 10 includes a base 26 secured to the horizontal arm 15 by any suitable means, such as screws, not shown. Adjajcent one end of the arm 15 of the bracket 12 is secured a fixed clamping member or plate 30 which is attached thereto by screws 31, said fixed clamping member having a V-shaped notch 32 at the inner side. The upper clamp includes a movable clamping member or jaw 33 having a pair of laterally spaced longitudinally extending openings 34 therethrough for reception of guide screws 35, guide screws 35 having heads 36 at their outer ends and having their inner ends externally threaded, as at 37, for threadable reception in tapped bores 36 provided therefor in the fixed clamping member 30. There is an enlarged recess 38 aligned axially with each of the bores 34, said recesses opening toward the fixed clamping member 30 and receiving end portions of springs 39 which react between the inner end of the recesses 38 and the adjacent side of the fixed clamping member. Springs 39 urge the movable clamping member or jaw away from the fixed clamping member and the heads 36 of the screws 35 limit movement of said movable clamping member away from the fixed clamping member. Intermediate the ends thereof said movable clamping member is provided with a pointed wedge which is aligned with the V-shaped notch 32 of the fixed clamping member for clamping a piece of wire, such as indicated at 41, in FIG. 3, in said notch.

Means for moving the movable clamping member toward the fixed clamping member comprises a pneumatic actuator, indicated generally at 45 and comprising a cylinder 46 fixed to the top arm 15 of the bracket 12. The cylinder 46 may be attached to said arm 15 by any suitable means, such as a bracket 47, having oppositely arranged flanges 48 attached to said arm 15 by means of screws 49. At the forward end of the cylinder 46 is a plunger guide 50 in which is slidably disposed a plunger 51 which has one end extending into the cylinder 46 and operably secured to a piston operably disposed therein, said piston not being shown. Plunger 51 has a tapped bore 53 extending longitudinally inwardly at its free end for threadable reception of an end portion of an externally threaded screw 54 which has a head 55 engageable with the side of the movable clamping member or jaw opposite the fixed clamping member. A lock nut 56 secures the screw 54 in desired adjusted positions.

Cylinder 46 is provided with fluid conduits 58 and 59 and the mechanism is so arranged that when pressure fluid is applied to one side of the piston referred to above, the plunger 51 is moved outwardly against the movable clamping member or jaw 33 to force same toward the fixed clamping member and clamp wire 41 in the recess 32. Pressure fluid on the other side of said piston will force the plunger 51 in a direction to release the movable clamping member and permit the springs 39 to move same away from the fixed clamping member.

Spaced upwardly of the bracket 12 is a shaft 70 having one end secured in an opening provided therefor in plate 18. The said end of shaft 70 may be either press fitted in said opening or the opening may be tapped and the end of the shaft received therein externally threaded for a threaded connection with said plate. The outer end of shaft 70 extends over the fixed clamping member 30 and there is a pulley 71 rotatably disposed on said shaft and secured in position by any suitable means, such as nuts 72, or the like. At one side the pulley is aligned with the recess 32, as best shown in FIG. 1.

Spaced below the upper clamp mechanism is the lower clamp 12 which comprises a fixed clamp member 75 having a depending portion 76 with a forwardly extending part 78 having a horizontal slot 80 and a depending slot portion 82 for reception of a screw 84 having a head 86 received in the slot 80 and the depending slot portion 82. The lower end of screw 84 is received in bores 88 of weights 90 of a weight means, indicated generally at 92, and the lower end of said screw 84 is threaded and threadably disposed in a tapped bore 94 in a plate 96 disposed beneath the weights 90 supporting same. The head 86 of the screw 84 is retained in slot 80 by means of a plate 98 secured to the adjacent portion of the fixed clamp member by screws 100.

Clamp 13 has a vertically extending V-shaped notch 102 in the outer face thereof and there is an arm 104 extending forwardly of said fixed clamp member 75 and to one side of said notch. At its forward end arm 104 has a laterally turned part 106 having a tapped bore 108 therethrough in alignment with the V-shaped notch. A screw 110 is threadably disposed in said tapped bore 108 and has a handle 112 at its forward or outer end. The opposite end of said screw is provided with a ball 114 for reception in a socket 116 of a wedge 118 having a point 120 adapted to enter the recess 102 for clamping the lower end of a wire being stretched and straightened in said recess. Wedge 118 is provided with an internal annular recess for reception of a snap ring 122 for retaining the ball 114 in said socket. The side of the wedge adjacent the arm 104 slidably engages said arm so that said wedge is held against rotation relative to the screw and notch 102 but is permitted to slidably move forwardly and rearwardly toward and away from said notch.

The mechanism includes a weight lifting mechanism, indicated generally at 130, which comprises a vertically arranged pneumatic cylinder 132 which is secured to a base plate 134, the latter being secured to support or wall 22 by any suitable means, such as screws 136, or the like. The cylinder has end members 138 and 140 secured to the ends of said cylinders by any suitable well known means, such as a screw thread connection, and said end members are provided with flanges 142 having openings therein for reception of screws 144 which are screwed into tapped openings provided therefor in the base plate to thereby hold the cylinder in operative position. End member 140 is provided with an opening through and in axial alignment with the cylinder for reception of an actuating rod 146. The inner end of rod 146 is secured to the usual actuated piston, not shown, while the lower end of said rod is secured in a stop collar 150 clamped about the rod 146 and disposed above a sliding plate 152. The lower end of said rod 146 is provided with a longitudinally extending tapped opening for reception of a screw 156 for securing the lower end of said rod 146 to said sliding plate 152. Plate 152 has an end member 158 slidably disposed in a vertical slot 160 in the base plate 134, whereby said sliding plate may be moved upwardly and downwardly by the piston rod or actuator rod 146 with corresponding movements of said rod.

Sliding plate 152 extends below the weight holder plate 96 and is adapted to carry the weights upwardly and downwardly with corresponding operative movements of the actuator mechanism. Cylinder 132 has upper and lower fluid connections 164 and 166 adjacent the respective ends thereof for providing operative pneumatic connections with said cylinder. The full pneumatic system will be described hereinafter.

Wire guide means, indicated generally at 168, is provided and comprises a bracket 170 secured to one side of a base plate 134 by means of screws 172, or the like. Bracket 170 has an arm 174 which extends laterally in front of the cylinder 132 and is provided with a forwardly extending flange 176 with a vertical slot 178 therein. Slot 178 is in operative alignment with the V-shaped notch 32 of the fixed clamping member of the upper clamp and also is in alignment with the V-shaped notch 102 of the lower clamp. Notch 178 is adapted to receive and guide and stabilize the wire being stretched and straightened.

There is means for controlling the downward movement of the weights to thereby control the amount of stretch given the wire. This means comprises a guide rod 180 having its upper end secured to a bracket 182 by means of a nut 184, said bracket 182 being secured to a suitable fixed support, such as wall 22, by means of a screw 186. The lower end of rod 180 is similarly secured to a bracket 188 by means of a screw 190 and said bracket 188 is attached to said support or wall by means of a screw 192. Mounted on the rod 180 is a switch mechanism, indicated generally at 196 and comprising a sleeve 198 slidable on rod 180 and adapted to be secured in adjusted position thereon by a nut 200. Secured to the sleeve 198 by any suitable means, such as screws or the like, not shown, is a switch 202 which may be a micro-switch, and is normally closed, said switch having a movable member 204 for actuation thereof. Sleeve 198 also has secured thereto a switch actuating lever 208, which is mounted to one arm 210 of a hinge having a second arm 212 secured to said sleeve. Arms 210 and 212 of said hinge are pivoted at 214. That portion of the lever 208 at the switch side of said sleeve extends over the switch operating plunger or member 204 and beyond said plunger. A weight 216 is disposed adjacent the outer end of said lever portion, said weight being sufficiently heavy to cause the end of the lever carrying said weight to move downwardly and engage plunger 204 of the switch to thereby actuate same to the open position. The opposite end of lever 208 extends to a position below the weight holder plate 96 and when said plate engages the latter end of said lever and moves downwardly the lever is actuated in a clockwise direction to raise the opposite end to allow switch 202 to open. By adjusting the position of the sleeve on the rod 180 the amount of stretch of the wire being stretched and straightened is controlled.

The electrical system shown in FIG. 5 comprises a variable transformer, indicated generally at 230, connected to a suitable source of electrical power by wires 232, 234, said source of power supplying power at 250 volts. The transformer 230 is connected to circuit breakers 238 and the latter are connected to the choke 240. These components, as well as those of contactor 242, are of well known character and do not need to be described in detail.

Wire 232 goes into the contactor, indicated generally at 242, and onto the fixed contact 244 of the normally closed switch 196. Movable contact member 246 of the switch has a connection with one of the fixed contacts, indicated at 248, of a switch, indicated generally at 250 of the contactor. Switch 250 is provided with a second fixed contact 252 which in turn is connected with a fixed contact 254 of a switch, indicated generally at 256. Switch 256 includes a fixed contact 258 which is connected by a wire 260 with a condenser, indicated at 262, wire 260 also being connected with coil 264 which has a connection 266 with ground 268. Contact 254 of switch 256 is operatively connected by wire 270 with the other plate of the condenser 262. Wire 232 has a connection 274 with one of the plates of a condenser 276 and the other plate of said condenser 276 is connected to the secondary transformer 280, said latter connection being wire 282. The choke includes a movable contact member 286 which has a connection 288 with one side of a condenser 290, the other side of said condenser being connected by a wire 292 with the secondary transformer. The latter is connected to the upper clamp 10, particularly the fixed clamping member 30 thereof, by a wire 294, said secondary transformer also having a connection 296 with the lower clamp 13.

Switch 250 includes a movable contact 300 adapted to be moved to a close position whereat it connects the fixed contacts 248 and 252 of the switch 250. Switch 256 includes a movable contact member 302 adapted to be moved from an open position to a closed position whereat it connects contacts 254 and 258 of switch 256. Stops 304 limit movement of the movable contact member 300 in the opening direction and stops 306 limit opening movement of the contact member 302 of switch 256.

Referring to FIG. 6, there is shown a pneumatic system of the present invention which comprises a supply conduit 310 adapted to be connected to a source of pressure fluid of any suitable character, said source being shown as a pressure tank 312. Supply conduit 310 is connected with a three-way valve 314 which has conduit connections 316 and 318 with the outer and inner ends of cylinder 46. Valve 314 also includes a discharge conduit 320. Alternatively, a discharge port may be used without the conduit 320, which discharges into atmosphere. A movable control lever 322 controls the position of the three-way valve. This lever, when in opposition, connects the supply conduit 310 with the conduit 316 to supply pressure fluid to the outer end of cylinder 46 and permits exhaust of fluid at the other end of the cylinder through conduit 318 and discharge or outlet conduit 320. When pressure is supplied through conduit 316 the piston in cylinder 46 is forced toward the opposite end of the cylinder 46. Lever 322 has another position whereat the supply conduit 310 is connected with the conduit 318 to supply pressure fluid to the inner end of cylinder 46 and force the piston therein toward the opposite end of said cylinder. At the same time conduit 316 is connected with the atmospheric or discharge conduit 320 to permit escape of air ahead of the moving piston.

A branch conduit 326 provides a pressure fluid supply connection from the supply conduit 310 to a three-way valve 328, which has connections 330 and 332 with the top and bottom ends of cylinder 132, respectively. Valve 328 also has an atmospheric discharge conduit 334. There is a lever or control handle 336 for said valve 328 and when said lever is in one position pressure fluid from the conduit 326 is supplied to the conduit 330 to supply pressure fluid to the upper end of the cylinder 132 and force the piston therein downwardly. At the same time fluid ahead of the downwardly moving piston discharges through the conduit 332 and the atmospheric conduit 334. When lever 336 is in another position the pressure fluid from the branch conduit 326 is supplied to the lower end of the cylinder 132 through the conduit 332 to force the piston in said cylinder upwardly. At the same time fluid above said piston is forced from the upper end of the cylinder through the conduit 330 and out the atmospheric conduit 334.

Wire to be processed by the present apparatus and in accordance with the present method is carried on a spool 340 rotatably mounted in a supporting frame 342 which is insulated from the floor or other supporting surface, said wire being indicated at 344.

Operation

When a length of wire is to be straightened, it is threaded up through insulated eye-guides, not shown, over the pulley 71 and down through the V-groove in the top clamp. The clamp is so designed that the wire cannot come out of the V-notch or groove 32 even when the clamp is open, due to the position of the wedge 40 relative to said groove 32.

The weight lift cylinder 132 is then supplied with pressure fluid to raise its piston so that the weight lifting sliding plate 152 is raised to the top position, which is determined by the stop-block 150 which is secured to the cylinder rod 146. The amount of movement of the rod 146 determines the amount of stretch that will be put in the wire and this movement of said rod 46 may be varied by putting various collar stops or stop-blocks on said rod.

The wire is then pulled down and clamped manually in the lower clamp 13. Thereafter, with the wire pulled to eliminate any slack, the upper clamp 10 is closed by supplying pressure fluid to its cylinder 46 by proper actuation of the valve 314. After the upper clamp is closed securely pressure fluid is supplied to the upper end of the weight lift cylinder 132 so as to lower the plate 152, leaving the weights 90 of the weight means 92 hanging by the wire.

Current is then turned on by proper actuation of the switch 256 and that portion of the wire between the clamps becomes red hot, due to its resistance, and loses its strength. When in this condition the wire stretches under the influence of the weight means 92, until said weight means comes to rest on the plate 152. Just before said weight means comes to rest on sliding plate 152 the weight holding plate 96 engages the adjacent end of the lever 208 of the switch 196 and actuates said lever in a clockwise direction; whereupon, the opposite end of said lever moves away from the movable switch member or plunger 204 thereby allowing the spring means, not shown, of the switch 196, to move the movable switch member 246 out of engagement with the fixed contact 244 and open the switch. This cuts off the electrical current to the wire section between the clamps and the wire cools. After cooling the wire is cut off adjacent the upper clamp and the lower end is released from the lower clamp. The heating part of the cycle takes only a few seconds and the cooling part takes a little longer. The time required for heating and the time required for cooling depend upon the size of the wire.

The weight, current, and amount of stretch must be determined experimentally for each diameter wire and given length. Some approximate figures for 62' finished lengths are:

|  | Weight, Lbs. | Amps | Volts | Amount of Stretch, Percent |
|---|---|---|---|---|
| Size, dia.: |  |  |  |  |
| .023 | 5½ | 5 | 90 | 10 |
| .045 | 22 | 23 | 77 | 15 |
| .065 | 45 | 32 | 67 | 20 |

The final wire diameter is approximately 5% less than the original diameter.

The finished wire is dead straight with little or no internal stresses and is in an annealed condition.

Various kinds of wire can be used, but that generally used for mandrels in the above referred to patent application Ser. No. 238,459 is stainless steel.

For present purposes the wire is precision ground and used as a mandrel for shrinking glass barrels. As above described, with normal straight wire, the heat required to melt the glass sufficiently to shrink it on the wire, relieves the stress in the wire and causes it to unwind or twist, which cracks the glass. Wire heated, stretched and straightened by the present apparatus and method overcomes this difficulty.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned except as defined by the accompanying claims, wherein, various portions have been separated for clarity of reading and not for emphasis.

I claim:

1. Wire stretching and straightening apparatus, comprising:
 (A) an insulated upper clamping means including,
  (a) a fixed clamping member having a V-shaped notch in one side,
  (b) a movable clamping member slidably mounted for sliding movement toward and away from said fixed clamping member, said movable clamping member having a pointed wedge shaped projection extending toward and adapted to enter into said V-shaped notch,
  (c) yielding means urging said movable clamping member away from said fixed clamping member;
  (d) and pneumatically operated actuator means for forcing said movable clamping member toward said fixed clamping member for clamping a wire in said notch;
 (B) a rotatable pulley operably disposed above and in alignment with said V-shaped notch;
 (C) a weight support below the upper clamping means aligned therewith and operably mounted for upward and downward movement;
 (D) a pneumatically operated actuator for moving said weight support upwardly and downwardly;
 (E) means limiting movement of said weight support upwardly;
 (F) means limiting downward movement of said weight support;
 (G) weight means adapted to rest on said weight support;
 (H) a manually actuatable lower clamping means carrying said weight means and operably aligned with the upper clamping means;
 (I) an insulated wire guide means disposed between and aligned with said clamping means;
 (J) a pneumatic supply system for supplying pressure fluid to the pneumatically actuated means for the upper clamping means for actuating same in clamping direction and in the releasing direction, said system also supplying pressure fluid to the actuator for raising and lowering the weight supporting means;
 (K) valve means for said pneumatic supply system for controlling pressure fluid to said actuators;
 (L) and an electrical system for connection with a source of electrical power, said system being operably connected with both clamping means, said electrical system including
  (a) switch means for controlling electric current to said clamping means,
  (b) and normally closed switch means positioned to be opened by the weight means when in its lowermost position.

2. Wire stretching and straightening apparatus, comprising:
 (A) an insulated upper clamping means including
  (a) a fixed clamping member;
  (b) a movable clamping member slidably mounted for sliding movement toward and away from said fixed clamping member,
  (c) yielding means urging said movable clamping member away from said fixed clamping member;
  (d) and a pneumatic actuator for forcing said movable clamping member toward said fixed clamping member for clamping a wire therebetween;
 (B) a wire guide operably disposed above and in alignment with said clamping members;
 (C) a weight support below the upper clamping means aligned therewith and operably mounted for upward and downward movement;
 (D) a pneumatic actuator operably connected with said weight support for moving said weight support upwardly and downwardly;
 (E) means limiting the movements of said weight support;
 (F) weight means adapted to rest on said weight support;
 (G) a manually actuatable lower clamping means carrying said weight means and operably aligned with the upper clamping means;
 (H) a pneumatic supply system for supplying pressure fluid for the pneumatic actuators for operating same;
 (I) means for controlling pressure fluid to said actuators;
 (J) and an electrical system for connection with a source of electrical power, said system having operable connections with both clamping means, said electrical system including
  (a) switch means for controlling electric current to said clamping means,
  (b) and normally closed switch means positioned to be opened by the weight means when in its lowermost position.

3. Wire stretching and straightening apparatus, comprising:
 (A) an upper clamping means including,
  (a) a fixed clamping member;
  (b) a movable clamping member slidably mounted for sliding movement toward and away from said fixed clamping member,
  (c) yielding means urging said movable clamping member away from said fixed clamping member;
  (d) and a fluid pressure operated actuator for forcing said movable clamping member toward said fixed clamping member for clamping a wire therebetween;
 (B) a weight support below the upper clamping means aligned therewith and operably mounted for upward and downward movement;
 (C) a fluid pressure operated actuator for moving said weight support upwardly and downwardly;
 (D) means limiting movement of said weight support upwardly and downwardly;
 (E) weight means adapted to rest on said weight support;
 (F) a lower clamping means carrying said weight means and operably aligned with the upper clamping means;
 (G) a fluid pressure supply system for supplying pressure fluid to said actuators;
 (H) means for controlling pressure fluid to said actuators;
 (I) and an electrical circuit operably connected with both clamping means, said electrical circuit including
  (a) switch means for controlling electric current to said clamping means,
  (b) and normally closed switch means positioned to be opened by the weight means when in its lowermost position.

4. In wire stretching and straightening apparatus:
 (A) an insulated, fixed, power operated wire clamping means;
 (B) weight supporting means spaced from and aligned with and adapted to be moved toward and away from said fixed clamping means;
 (C) means limiting movement in both directions of said weight supporting means;
 (D) power operated means operably connected with said weight supporting means for operably moving said weight supporting means in both directions;

9

(E) manually operable second wire clamping means spaced from the first mentioned clamping means and aligned therewith and with said weight supporting means;
(F) weight means connected with the second wire clamping means and adapted to seat on said weight supporting means and be raised thereby;
(G) pressure fluid operated means operably connected with the first mentioned wire clamping means for operating said first mentioned wire clamping means;
(H) means for controlling pressure fluid to said power operated clamping means;
(I) pressure fluid operated means for operating said weight supporting means;
(J) means for controlling pressure fluid to the pressure fluid operated means;
(K) electrical circuit means operably connected with both clamping means;
(L) switch means controlling said circuit;
(M) and second switch means for controlling said circuit, said second switch means being normally closed and being openable by the weight means when the latter is in its lowermost position.

5. In wire stretching and straightening apparatus:
(A) an insulated, fixed power operated wire clamping means;
(B) weight supporting means spaced from, aligned with and adapted to be moved toward and away from said fixed clamping means;
(C) means limiting movement in both directions of said weight supporting means;
(D) power operated means operably connected with said weight supporting means for operably moving said weight supporting means in both directions;
(E) manually operable second wire clamping means spaced from the first mentioned clamping means and aligned therewith and with said weight supporting means;
(F) weight means connected with the second wire clamping means and adapted to seat on said weight supporting means and be raised thereby;
(G) means for controlling both of said power operated means;
(H) electrical circuit means operably connected with both clamping means;
(I) and switch means controlling said circuit.

6. In wire stretching and straightening apparatus:
(A) a fixed wire clamping means;
(B) a weight attachable to a length of wire clamped in said wire clamping means;
(C) means for operably moving said weight relative to said fixed clamping means for exerting a predetermined longitudinal pull of said wire;
(D) electrical means for supplying electrical power to said length of wire to heat same to a temperature whereat said wire will stretch under the influence of said weight;
(E) and means limiting the amount said wire is stretched.

7. In wire stretching means:
(A) means for operably securing a length of wire to be stretched;
(B) means for electrically heating a length of wire operably secured in said securing means to a temperature whereat said wire will stretch, utilizing the electrical resistance of said wire to effect such heating;
(C) and means for applying a longitudinal stretching force to said wire when at said temperature.

8. The invention defined by claim 7, wherein said wire is stretched a predetermined amount.

9. A method for straightening and stretching wire, comprising the steps of:
(A) securing one end of a length of wire to be straightened and stretched in a movable, weighted clamp;

10

(B) raising said weighted clamp a predetermined distance;
(C) securing the other end of said length of wire in a fixed insulating clamp;
(D) allowing the wire to support the weighted clamp;
(E) supplying electric current to said clamps using the resistance of the length of wire between said clamps to heat same red hot and be stretched and straightened by the weight of said weighted clamp;
(F) stopping the descent of the weighted clamp at a predetermined position whereat the wire will be stretched a predetermined amount;
(G) and automatically cutting off the current to the clamps when the weighted clamp has reached its lower position.

10. In a method for stretching and straightening a length of wire, the steps of:
(A) securing a length of wire in spaced apart securing means;
(B) supplying electric current to said length of wire using the resistance of said wire to effect heating same to a stretchable condition;
(C) moving said securing means a predetermined distance farther apart relative to each other and longitudinally of the wire while the wire is thus heated;
(D) and cutting off the current from said wire.

11. In a method for stretching a length of wire:
(A) electrically heating a length of wire to a temperature whereat said wire may be stretched to reduce its cross sectional size, utilizing the resistance of said wire to effect said heating;
(B) stretching said length of wire longitudinally a predetermined amount while thus heated;
(C) and allowing same to cool after being thus stretched.

12. In a method for stretching a length of wire:
(A) heating a length of wire to a temperature whereat said wire may be stretched;
(B) stretching said wire longitudinally a predetermined amount while thus heated to reduce its diameter;
(C) and allowing said wire to cool.

13. In a method for stretching wire:
(A) heating a length of wire to a temperature whereat said wire may be stretched;
(B) and stretching said wire longitudinally a predetermined amount while thus heated.

14. In a method for straightening wire:
(A) heating a length of wire to a temperature whereat said wire may be stretched;
(B) and pulling said wire longitudinally a predetermined amount while thus heated to thereby straighten said wire.

15. In wire straightening apparatus:
(A) a fixed wire clamping means;
(B) a weight attachable to a length of wire clamped in said wire clamping means;
(C) means for operably moving said weight relative to said fixed clamping means for exerting a predetermined pull on said wire to thereby straighten said wire and eliminate internal stresses in said wire.

References Cited

UNITED STATES PATENTS

| 784,101 | 3/1905 | Brinkman | 72—316 |
| 1,332,658 | 3/1920 | Barstow | 219—153 |
| 2,286,893 | 6/1942 | Boisson | 72—342 |
| 2,477,020 | 7/1949 | Van Sant | 72—295 |

FOREIGN PATENTS 729,216  12/1942  Germany.

CHARLES W. LANHAM, *Primary Examiner.*

E. M. COMBS, *Assistant Examiner.*